United States Patent
Finney

(10) Patent No.: US 9,393,568 B2
(45) Date of Patent: Jul. 19, 2016

(54) MOBILE WOOD CHIPPER

(71) Applicant: Richard Walter Finney, Morrison, CO (US)

(72) Inventor: Richard Walter Finney, Morrison, CO (US)

( * ) Notice: Subject to any disclaimer, the term of this patent is extended or adjusted under 35 U.S.C. 154(b) by 414 days.

(21) Appl. No.: 13/837,745

(22) Filed: Mar. 15, 2013

(65) Prior Publication Data
US 2014/0263785 A1   Sep. 18, 2014

(51) Int. Cl.
*B02C 21/02* (2006.01)
*A01G 3/00* (2006.01)
*B02C 18/16* (2006.01)

(52) U.S. Cl.
CPC ............. *B02C 21/02* (2013.01); *A01G 3/002* (2013.01); *B02C 2018/162* (2013.01)

(58) Field of Classification Search
CPC ...... A01G 3/002; A01G 23/067; B02C 21/02; B02C 2018/162; B27L 11/00; B27L 11/02; B27L 11/002; B27L 11/005; B60P 1/48; B60P 1/483
USPC ............. 144/4.1, 176, 241.2, 337, 369, 370, 144/373; 224/92, 101.74–101.76, 402–403, 224/510, 554; 280/762, 769; 296/26.09, 296/37.1; 414/522, 546; 212/256; 241/101.74

See application file for complete search history.

(56) References Cited

U.S. PATENT DOCUMENTS

| | | | | |
|---|---|---|---|---|
| 3,006,487 A | * | 10/1961 | Gelli | B60R 5/04 414/522 |
| 3,768,673 A | * | 10/1973 | Nydam et al. | B60P 1/433 296/26.1 |
| 3,885,686 A | * | 5/1975 | Siebring | B60P 1/483 414/549 |
| 4,058,229 A | * | 11/1977 | Triplett | B60P 1/48 212/256 |
| 4,062,498 A | | 12/1977 | Szepaniak | |
| 4,796,819 A | | 1/1989 | Waterman | |
| 4,824,158 A | * | 4/1989 | Peters et al. | 296/37.6 |
| 4,951,882 A | * | 8/1990 | Ober | 241/55 |
| 4,961,539 A | | 10/1990 | Deem | |

(Continued)

OTHER PUBLICATIONS

International Search Report, Jul. 28, 2014, for PCT/US2014/023636.

*Primary Examiner* — Mark Rosenbaum
(74) *Attorney, Agent, or Firm* — Robert G. Crouch; Marsh Fischmann & Breyfogle LLP

(57) ABSTRACT

A mobile wood chipper that is mounted to a motor vehicle. The wood chipper has an input hopper that during operation is desirably located at a convenient height for a user. In the case of mounting in a station wagon or van, a slidable structure may be used to allow the wood chipper to be slid into an operational position with the wood chipper at least largely outside the vehicle, and a stowed position with the wood chipper at least largely inside the vehicle. In the case of mounting in a truck, a lift mechanism may be used to allow the wood chipper to be lowered into an operational position with the wood chipper at a convenient height for a user, and lifted up into a stowed position within the truck bed. A power generator is also included to supply power to the wood chipper.

20 Claims, 14 Drawing Sheets

(56) References Cited

U.S. PATENT DOCUMENTS

| | | | | |
|---|---|---|---|---|
| 5,064,335 A | * | 11/1991 | Bergeron et al. | 414/522 |
| 5,090,335 A | * | 2/1992 | Russell | B60P 1/433 |
| | | | | 108/44 |
| 5,102,056 A | * | 4/1992 | Ober | B02C 13/04 |
| | | | | 241/100 |
| 5,115,845 A | * | 5/1992 | Hooser | A01G 23/067 |
| | | | | 144/208.9 |
| 5,402,950 A | | 4/1995 | Blair et al. | |
| 5,457,271 A | * | 10/1995 | Aulson | B60P 3/14 |
| | | | | 241/101.741 |
| 5,603,459 A | * | 2/1997 | Gearing et al. | 241/56 |
| 5,645,235 A | * | 7/1997 | Witte | 241/101.741 |
| 5,707,017 A | * | 1/1998 | Paolucci et al. | A01G 1/125 |
| | | | | 15/330 |
| 6,293,479 B1 | * | 9/2001 | Kaczmarski et al. | 241/92 |
| 6,398,140 B1 | * | 6/2002 | Stieh et al. | A01G 3/002 |
| | | | | 241/101.741 |
| 6,499,610 B2 | * | 12/2002 | Spitsbergen | 212/179 |
| 6,661,107 B2 | * | 12/2003 | Higuchi et al. | 290/1 A |
| 6,830,204 B1 | | 12/2004 | Morey | |
| 7,070,132 B1 | * | 7/2006 | Gassman | 241/28 |
| 7,293,723 B2 | * | 11/2007 | Niemela et al. | 239/672 |
| 7,431,231 B1 | * | 10/2008 | Saiki | 241/101.78 |
| 8,307,866 B2 | * | 11/2012 | Leonard | 144/176 |
| 2002/0021016 A1 | | 2/2002 | Bergquist et al. | |
| 2005/0126319 A1 | * | 6/2005 | Jones | 74/11 |
| 2010/0193620 A1 | | 8/2010 | Anderson | |
| 2010/0282882 A1 | | 11/2010 | Zeller | |
| 2011/0214423 A1 | * | 9/2011 | Givens | 60/626 |

\* cited by examiner

MOBILE WOOD CHIPPER

BACKGROUND

In many areas, it is desirable to remove slash to reduce the risk of wildfire and to improve the appearance of the property. Slash in this case refers to tree branches and other natural growth and residue on the ground. It may result from a variety of causes: after the cutting of timber; the natural falling of trees and branches; the death of various underbrush for a variety of reasons; as well as other causes. Slash primarily includes limbs and branches but not the trunks of trees. These limbs and branches generally do not have the useful applications that are found for the trunks (lumber, firewood) yet this slash is of greater potential fire danger.

The volume of slash, particularly in certain areas (e.g., the foothills of the Rocky Mountains) can be quite high and make it difficult to easily clear a given area. Additionally in the dry climate of much of the Western U.S., slash may take decades to decompose on its own. Adding to the difficulty of clearing a given area of slash may be the nature of the terrain. In certain areas, the terrain can be quite rugged and uneven which can drastically limit the type of vehicles that can access the area. In some areas, larger vehicles would do irreparable harm to the terrain either directly or indirectly through the need to construct or enlarge access roads.

Wood chippers can be used to "process" the slash and reduce or convert it to small wood chips that can be left in the area without significant wildfire risk and without looking as unsightly as slash. Wood chippers are often portable, being mounted on wheeled trailer frames suitable for towing behind a truck or van. Power is generally provided by an internal combustion engine from 10 horsepower (7.5 kW) to 100 horsepower (75 kW). There are also high-power wood chipper models mounted on trucks and powered by a separate engine. These models (which may include hydraulic input hopper feed systems) may also have a hydraulic crane, which can assist in feeding large objects (wood pallets, tree trunks) into these large chippers.

Because of the rugged terrain where it may be desirable to clear slash, it is typically not possible to drive a large truck (with a wood chipper mounted thereon) to the rugged area where the slash exists. Similarly, it may not be possible to drive a sufficiently-large truck/van (with a wood chipper in tow behind) to the rugged area. Accordingly, the current solution is to manually pick up the slash in the rugged area and drag or haul it to an area that the truck can access. This is, of course, very labor intensive, and thus often not carried out, leaving a vast collection of high danger slash available for potential wildfire ignition.

Even in areas where trucks can bring a wood chipper, there may be significant expense associated with driving a truck to that area, in addition to the large cost of a large truck (with trailored chipper and engine) based solution (current practice). What is needed, therefore, is a way to get a wood chipper to more rugged areas and to more economically get a wood chipper to less rugged areas.

SUMMARY

Disclosed herein is an apparatus supported by and carried by a passenger automobile. The apparatus includes a slidable structure having a first portion that is slidable relative to a second portion, wherein the second portion is supported by the passenger automobile, wherein the first portion can be slid between a first position and a second position. The apparatus also includes a wood chipper module movable between a first position and a second position and a power generator carried by the passenger automobile that supplies power to the wood chipper module. When the wood chipper module is in the first position, the wood chipper module is entirely contained within the passenger automobile and when the wood chipper module is in the second position, a majority of the wood chipper extends outside of the passenger automobile and the wood chipper module is at least partially supported by the slidable structure and the first portion of the slidable structure is in the second position.

The wood chipper module may include a hopper selectively attached thereto that receives slash fed thereto by a user, wherein the hopper can be removed by the user for moving the wood chipper module into the first position and the hopper can be attached to the wood chipper module when the wood chipper module is in the second position. The power generator may be mounted to a roof of the passenger automobile. The passenger automobile may be a station wagon.

Also disclosed herein is an apparatus that includes a passenger automobile; a slidable structure having a first portion that is slidable relative to a second portion, wherein the second portion is supported by the passenger automobile, wherein the first portion can be slid between a first position and a second position; a wood chipper module that can be moved between a first position and a second position; and a power generator carried in the passenger automobile that supplies power to the wood chipper module. When the wood chipper module is in the first position, the wood chipper module is entirely contained within the passenger automobile and when the wood chipper module is in the second position, a majority of the wood chipper extends outside of the passenger automobile and the wood chipper module is at least partially supported by the slidable structure.

The wood chipper module may include a hopper selectively attached thereto that receives slash fed thereto by a user, wherein the hopper can be removed by the user for moving the wood chipper module into the first position and the hopper can be attached to the wood chipper module when the wood chipper module is in the second position. The power generator may be mounted to a roof of the passenger automobile. The passenger automobile may be a station wagon.

Also disclosed herein is an apparatus supported and carried by a motor vehicle, the motor vehicle having a surface on which the apparatus is supported that is two feet or less from the ground. The apparatus includes a slidable structure having a first portion that is slidable relative to a second portion, wherein the second portion is supported by the passenger automobile, wherein the first portion can be slid between a first position and a second position; a wood chipper module that can be moved between a first position and a second position, the wood chipper module having a bottom; and a power generator carried in the motor vehicle that supplies power to the wood chipper module. When the wood chipper module is in the first position the wood chipper module is entirely contained within the vehicle and when the wood chipper module is in the second position a majority of the wood chipper extends outside of the motor vehicle and the bottom of the wood chipper is two feet or less above the ground.

The wood chipper module may include a hopper with an intake port having a bottom edge that is four feet or less above the ground. The wood chipper module may include a hopper selectively attached thereto that receives slash fed thereto by a user, wherein the hopper can be removed by the user for moving the wood chipper module into the first position and the hopper can be attached to the wood chipper module when the wood chipper module is in the second position.

The power generator may be mounted to a roof of the passenger automobile. The motor vehicle may be a station wagon. The motor vehicle may be a van or a truck. The apparatus may further include a lift mechanism for lowering the wood chipper module from a bed of the truck into a lower position for operation and for raising the wood chipper module back on to the bed of the truck for transport.

Also disclosed herein is an apparatus supported by and carried by a passenger automobile. The apparatus includes a wood chipper module movable between a first position and a second position and a power generator carried in the passenger automobile that supplies power to the wood chipper module. When the wood chipper module is in the first position, the wood chipper module is entirely contained within the passenger automobile and when the wood chipper module is in the second position a majority of the wood chipper extends outside of the passenger automobile.

The wood chipper module may include a hopper selectively attached thereto that receives slash fed thereto by a user, wherein the hopper can be removed by the user for moving the wood chipper module into the first position and the hopper can be attached to the wood chipper module when the wood chipper module is in the second position. The power generator may be mounted to a roof of the passenger automobile. The passenger automobile may be a station wagon.

BRIEF DESCRIPTION OF THE DRAWINGS

The disclosure herein is described with reference to the following drawings, wherein like reference numbers denote substantially similar elements.

DETAILED DESCRIPTION

Figure 1:
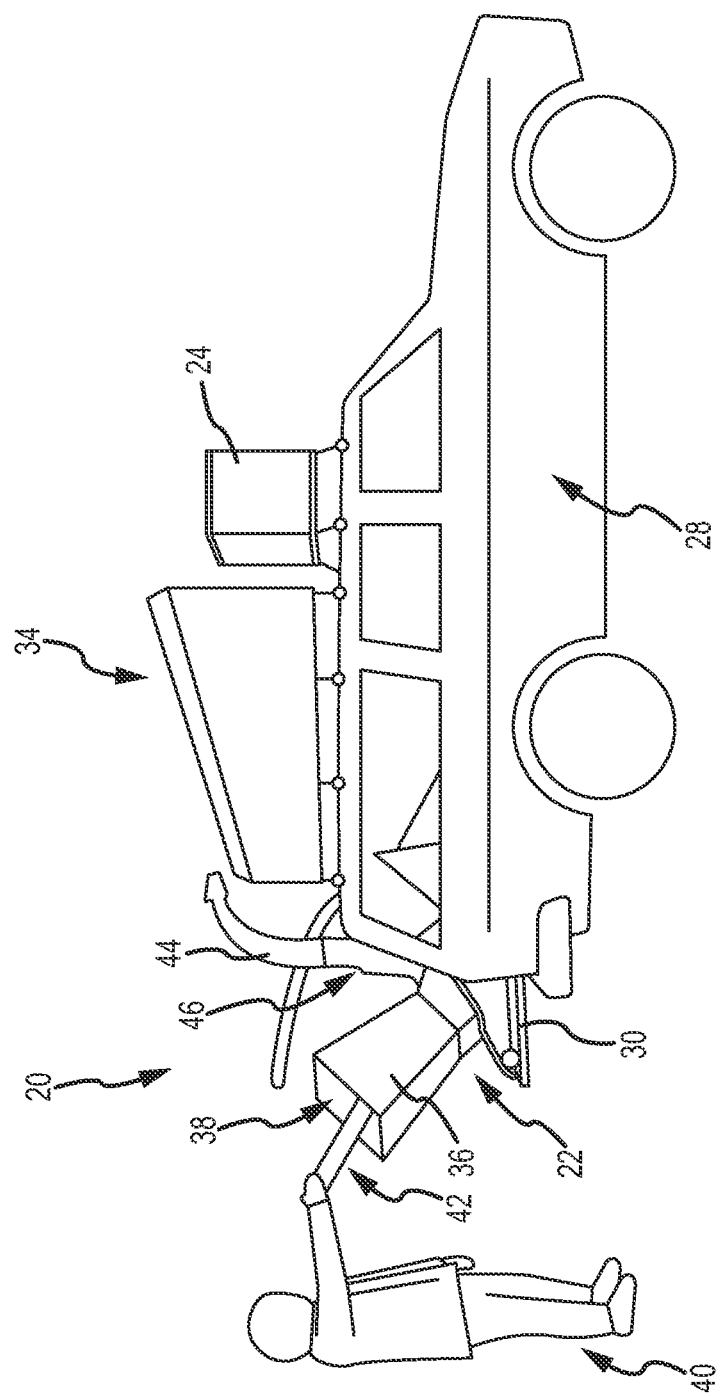
FIG. 1 is a sketch of a mobile wood chipper mounted in a station wagon, the wood chipper shown in an operational position with a user feeding slash into an input hopper thereof.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Disclosed herein is a mobile wood chipper that is carried within a motor vehicle, such as a station wagon, hatchback, van, or small pick-up truck. The vehicle is small enough so as to be drivable across rugged uneven terrain and on jeep trails and the like. The vehicle may or may not be a 4-wheel or all-wheel drive vehicle. The vehicle may be drivable on terrain that large trucks are not drivable on. Various host vehicles may be selected, and not all would have off-road capabilities while all would generally be smaller than trucks. These vehicles may get better gas mileage and be more economical (including initial investment) than a large truck. The mobile wood chipper may be mounted in the motor vehicle in a manner that allows it to be moved between a stowed position for transit and an operational position that is easy and convenient for a user operating the wood chipper. The stowed, transit position may include the entirety (or the substantial majority) of the mobile wood chipper being within the vehicle and in a position where the center of gravity of the wood chipper is not to the aft of the rear wheels, potentially unloading the front wheel weight, and potentially reducing stability. The operational position may include the wood chipper having a significant portion thereof extending outside of the vehicle and/or the center of gravity of the wood chipper being not between the wheels of the vehicle (both in a front to back direction and in a lateral direction).

In one embodiment, shown in FIG. 1, a mobile wood chipper 20 includes a wood chipper module 22, a power generator 24, and apparatus for attaching the wood chipper module 22 to a passenger vehicle. The wood chipper module 22 is shown attached to a passenger vehicle 28 (in this case a station wagon) with a slidable structure 30 as an attaching apparatus, in this case a "shoehorn" structure. On top of the passenger vehicle 28 is the power generator 24 and a receptacle 34 for wood chips produced by the wood chipper module 22. It can be seen that the wood chipper module 22 includes an input hopper 36 having an inlet port thereof 38 that is located at convenient height for a user 40. In this case, the user 40 is able to feed slash 42 into the inlet port 38 of the input hopper 36 with the arm of the user being extended generally horizontally from their shoulder. Wood chips are expelled from a discharge hood or chute 44.

Figure 2:
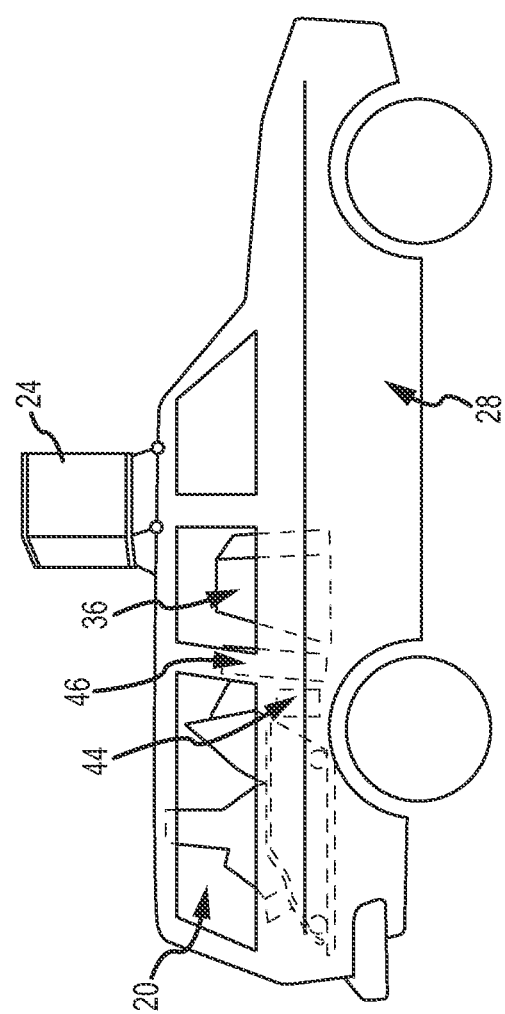
FIG. 2 is a sketch of a mobile wood chipper mounted in a station wagon, the wood chipper shown in a stowed position within the station wagon.

FIG. 2 shows the wood chipper 20 after it has been moved from the operational position of FIG. 1 to a stowed position so that the vehicle 28 can be driven to another location. As can be seen, the power generator 24 may still be attached to the roof of the vehicle 28, while the other portions of the wood chipper 20 are located entirely within the vehicle when in this stowed or transit position. As can be seen, the input hopper 36, an upper portion 46 of the housing surrounding the chamber where the slash 42 is chipped, and the chute 44 may be removed from the wood chipper module 22 and placed inside of the station wagon 28 in order to allow the remainder of the wood chipper module 22 to be slid inside of the station wagon. Larger vehicles will allow the power generator to also be within the vehicle envelope for transit.

Figure 3:
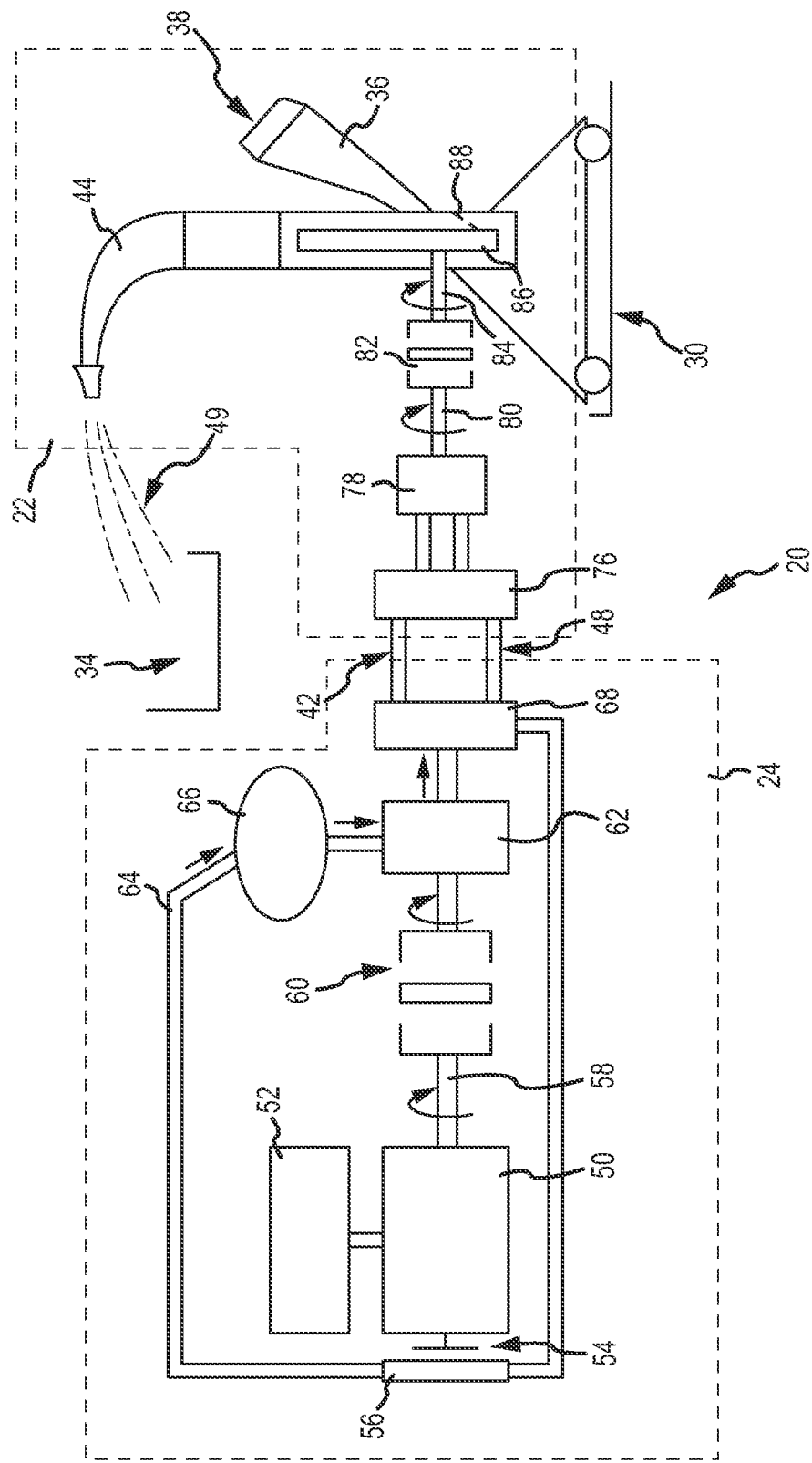
FIG. 3 is a block diagram of a mobile wood chipper, including both the power unit and the wood chipping mechanism.
Figure 4A:
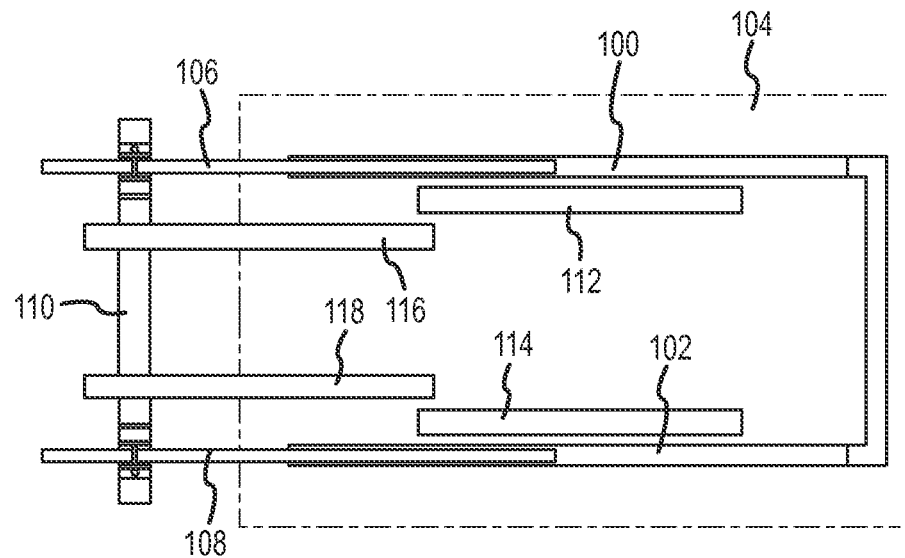
FIGS. 4A and 4B are a top view and a perspective view, respectively, of the slidable structure used for moving a wood chipper module between positions.
Figure 4B:
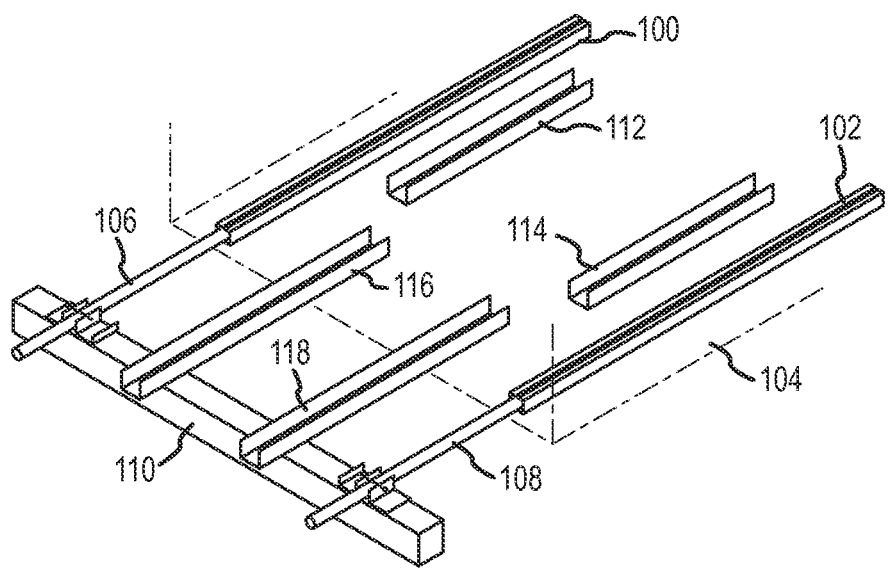

FIG. 3 shows the primary components of the mobile wood chipper 20. As can be seen, the power generator 24 provides hydraulic power via hydraulic fluid lines 48 to the wood chipper module 22, although alternate implementations could be accomplished via electric or direct drive technology. The wood chipper module 22 is mounted to a support structure such as the slidable structure 30. The wood chipper module 22 receives slash 42 at the input hopper 36 and expels wood chips 49 from a chute 44, which may be collected in a receptacle 34. In this embodiment, the power generator 24 includes a gasoline engine 50 and an associated gasoline tank 52. The engine 50 has a fan 54 that it turns to help to cool a hydraulic fluid radiator 56. The engine 50 turns a rotating shaft 58 that is connected via a coupler 60 to a hydraulic pump 62. The hydraulic pump provides pressure moving hydraulic fluid in a fluid circuit 64 associated with the power generator 24. The fluid circuit 64 includes a fluid reservoir 66, the radiator 56, a control unit 68, and fluid lines connecting these components. The control unit 68 can be operated by the user 40 to control operation of the power generator 24 and of fluid flow therein and there from. The fluid can be routed from the hydraulic pump to the radiator and back to the reservoir for return to the hydraulic pump. In addition, when it is desired to supply hydraulic power externally from the power generator 24, the control unit 68 acts to provide fluid flow through the fluid lines 48 interconnected between the power generator 24 and the wood chipper module 22, as for test/characterization.

The wood chipper module 22 includes a control unit 76 that can be used by the user 40 to control operation of the wood chipper module 22. The fluid from the power generator 24 can be directed to a hydraulic motor 78 in the wood chipper module 22 where the hydraulic power is converted to rotation of a shaft 80. The shaft 80 is connected via a coupler 82 to a shaft 84 associated with an inertial wheel 86 having cutter blades 88 thereon. As one example, the inertial wheel may have a weight of approximately 70-110 pounds, although any suitable inertial wheel could be used. The input hopper 36 directs slash provided to an input port 38 thereof into the chamber containing the rotating inertial wheel 86 with the cutter blades 88 thereon. The slash 42 is reduced to woodchips by the wheel 86 and cutter blades 88 and the woodchips are expelled through the chute 44 from the wood chipper module 22.

FIGS. 4-11 show further detail about the slidable structure that allows for movement of the wood chipper module between the stowed position and the operational position. As seen from above in FIG. 4, the structure includes a pair of metal guide channels 100 and 102 resting (like a shoehorn) in the bed 104 of the back-end of the passenger vehicle 28. The guide channels 100 and 102 (also known as strut channels; e.g., such as those available under the brand Unistrut®) may be three-sided and open on a top side and have inwardly-facing lips along opposite sides of the open top. A pair of cylindrical pipes (or rods) 106 and 108 are slidably retained within the guide channels 100 and 102. A track support assembly 110 is affixed to the pipes 106 and 108 near ends thereof. Also included are a pair of front tracks 112 and 114 and a pair of rear tracks 116 and 118. The front tracks 112 and 114 are supported by the vehicle bed 104 and may remain stationary. The rear tracks 116 and 118 are supported by the vehicle bed 104 and in part by the track support assembly 110. The rear tracks 116 and 118 can be moved from a position entirely within the vehicle 28 and on the vehicle bed 104 to a position extending partially out of the vehicle 28 and partially off of the vehicle bed 104.

Figure 5:
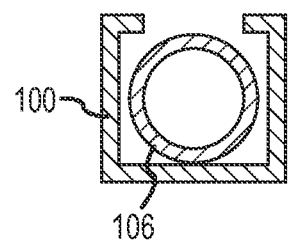
FIG. 5 is a close-up of a portion of the slidable structure of FIG. 4, showing a pipe slidably received within a guide channel.
Figure 6:
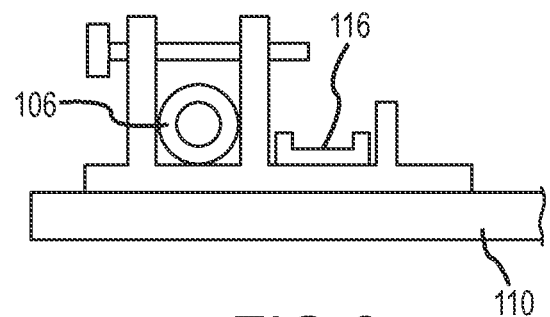
FIG. 6 is a close-up of a portion of the slidable structure of FIG. 4, showing a track support assembly.
Figure 7:
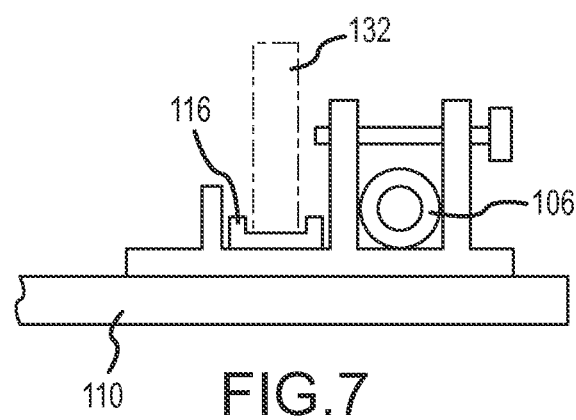
FIG. 7 is a close-up of a portion of the track support assembly of FIG. 6, showing a wheel which rides in the track.

FIG. 5 provides a close-up view of how the cylindrical pipe 106 is slidably retained within the guide channel 100. FIG. 6 provides further detail on the attachment of the track support assembly 110 to the pipes 106 and 108 via L-brackets and bolts. FIG. 6 also shows how the rear tracks 116 and 118 are supported by the track support assembly 110 with L-brackets. FIG. 7 shows this assembly from the opposite side, with the addition of a castor wheel 132 (in phantom).

Figure 8:
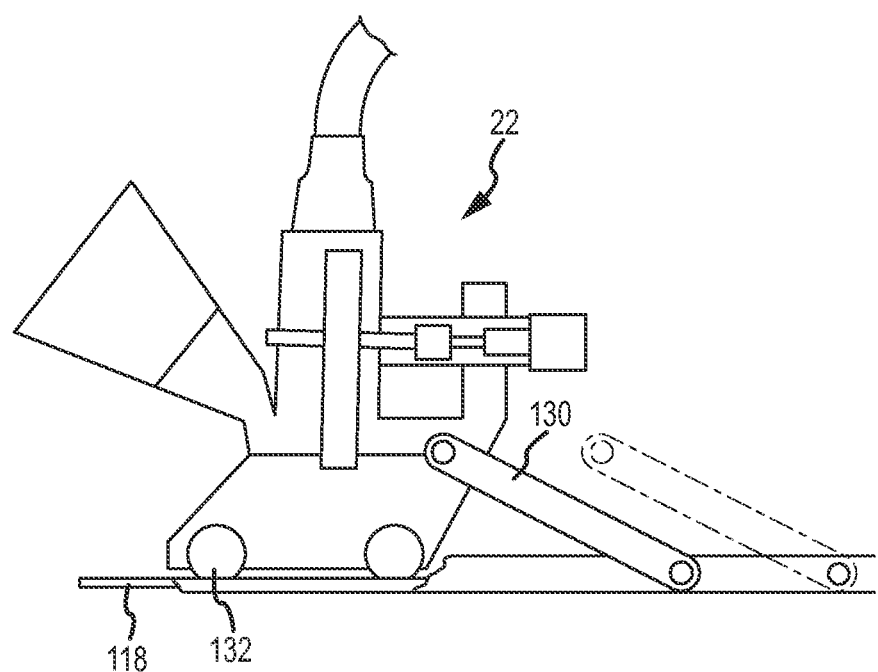
FIG. 8 is a side view of the wood chipper module and its attachment to a guide channel with a sway bar, for locking the chipper in position.

FIG. 8 shows that a sway bar 130 may be used to retain the wheeled wood chipper module 22 in place in the selected position (stowed or operational). Although only one sway bar 130 is shown, two or more could be used. It is anticipated that many embodiments would include two such sway bars, one on each lateral side. As can be seen, the sway bar 130 is pivotably attached to the wood chipper module 22 and is selectably attached to one of two or more holes defined in the guide channels via a clevis bolt 134.

Figure 10:
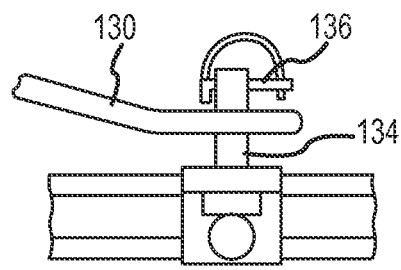
FIG. 10 is a close-up view of the attachment of the sway bar to the guide channel.
Figure 11:
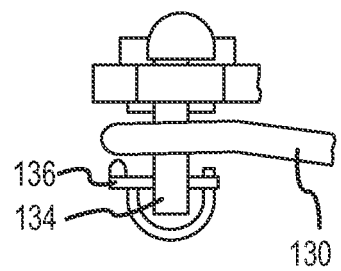
FIG. 11 is another close-up view of the attachment of the sway bar to the guide channel.

FIGS. 10 and 11 show more detail about the attachment of the sway bar 130 to the guide channel with clevis bolts 134. The sway bars 130 are used to secure the chipper 20 during transit. For convenience, the attachment is repeated for the operational position, even though the locking feature of the castor wheels 132 would be sufficient to hold the chipper in position. The sway bars 130 have a hole in each end which slides over matching clevis bolts 134. The bar 130 is held from sliding off these bolts 134 with clevis/cotter pins 136. To allow movement of the chipper 20, the clevis pins 136 are pulled and the end of the sway bar 130 is slid free of the clevis bolt 134, and then the sway bars 130 are attached similarly to the next position to be held.

Figure 9:
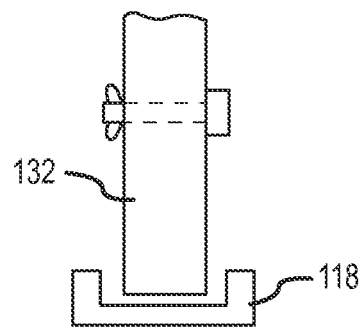
FIG. 9 is a close-up view of a castor of the mobile wood chipper and a rear track of the slidable structure.

FIG. 9 shows a rear castor wheel 132 located just above one of the rear tracks 118. In order to extend the rear tracks 116 and 118 outside of the vehicle to the track support assembly 110 on the extended pipes 106 and 108, the wood chipper module 22 can be lifted slightly (such as to the position shown in FIG. 9) to take the weight of the module 22 off of the tracks. The module 22 could be lifted via any suitable means. One example is via a curved lever such as a small common "L" bar similar to a crowbar.

While the slidable structure 30 is not shown to be affixed to the passenger vehicle 28, it may be desirable to provide attachment such as direct fastening with bolts, through a strap arrangement that is affixed to the vehicle, or through any other suitable means. Whether the chipper 20 needs to be affixed to the vehicle is a function of whether the CG (center of gravity) of the chipper remains within or extends out of the vehicle. In the station wagon embodiment, the CG of the chipper is never outside the vehicle, while in most other embodiments the CG is cantilevered from the vehicle.

Figure 21:
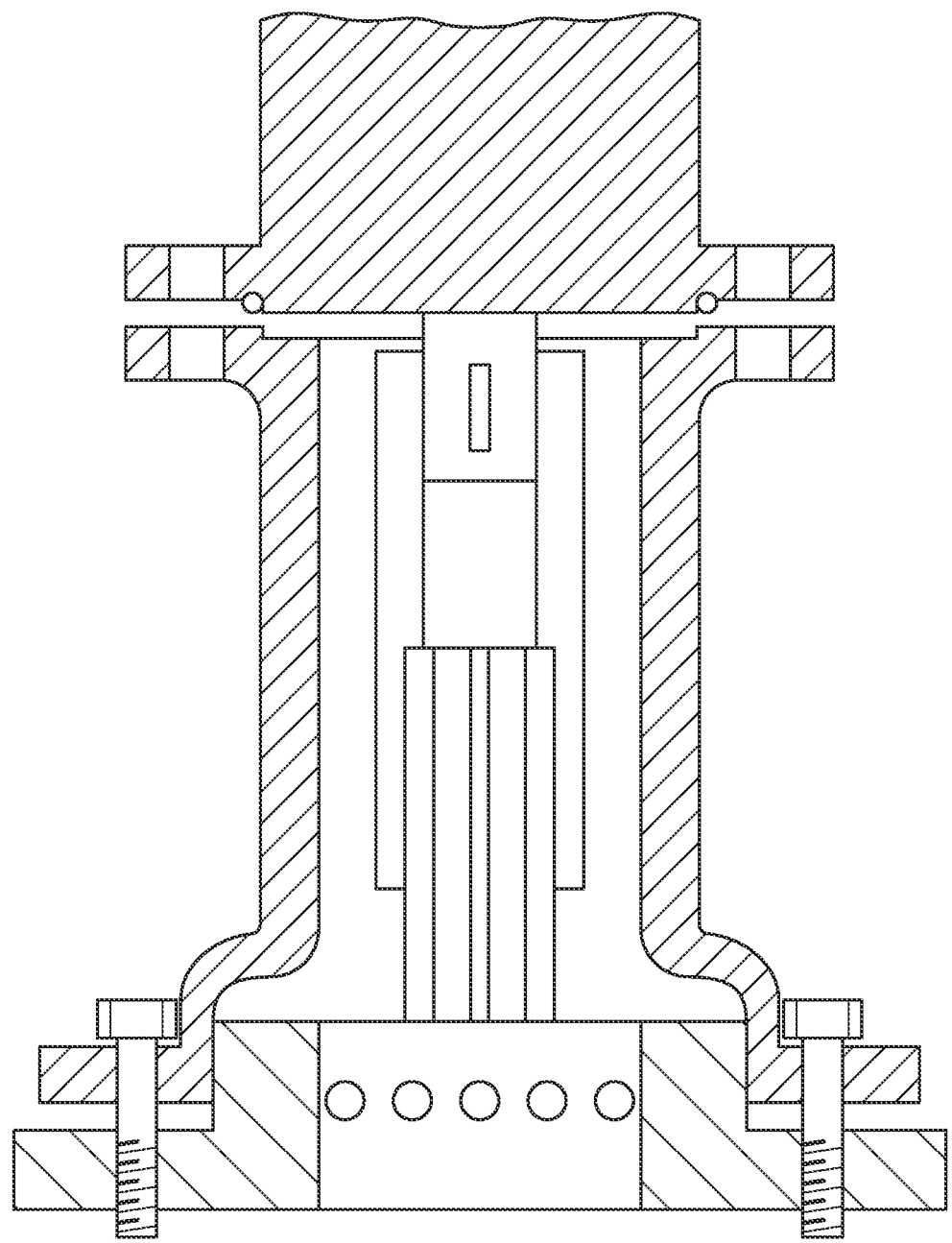
FIG. 21 shows a coupler.

FIG. 21 shows an example of a coupling that could be used to couple the power generator 24 to the wood chipper module 22. This was custom built by, and is very similar to but larger than the coupler in the power generator 24 from the gas engine to the hydraulic pump. This is known as a "Lovejoy" technique. It uses a neoprene flexible toothed (6 teeth) fitting loosely held within a pair of "LoveJoy" couplers. This is a common coupler configuration in other mechanisms at lower (less than 1000) rotational speeds, yet handles significant horsepower transmission.

Figure 13:
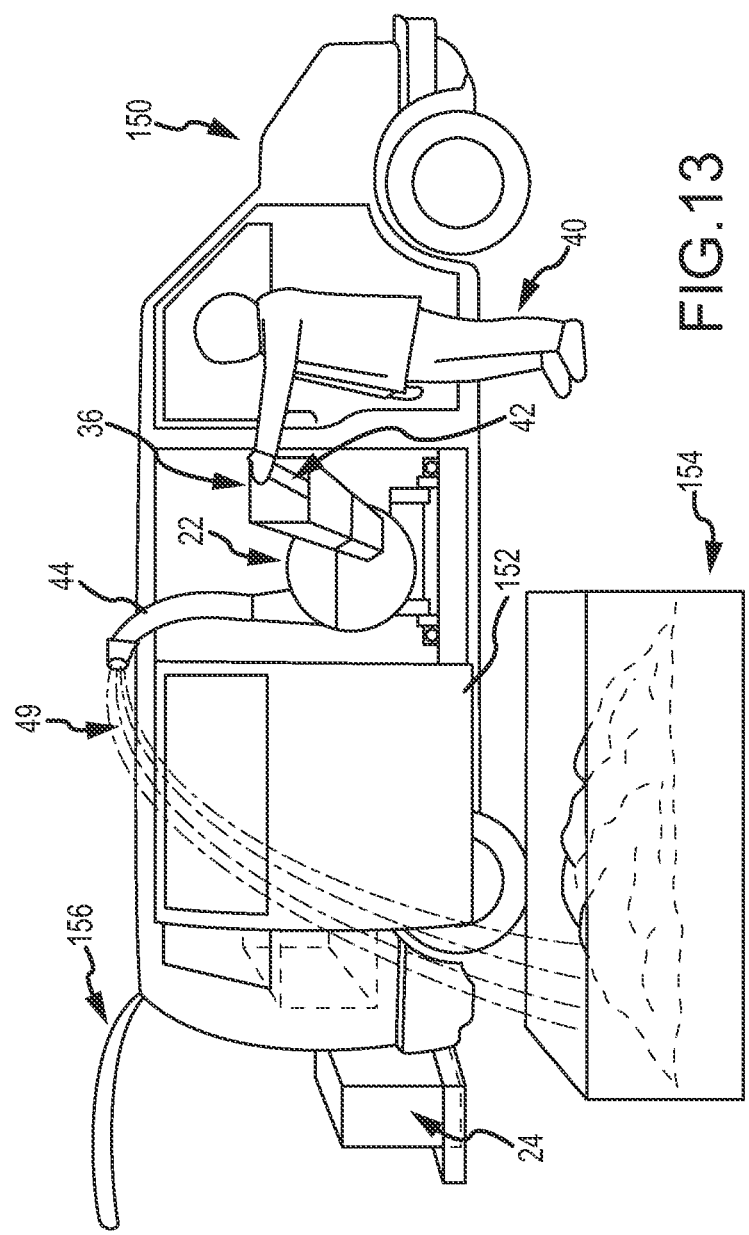
FIG. 13 is a sketch of a mobile wood chipper mounted in a van, the wood chipper shown in an operational position with a user feeding slash into an input hopper thereof.

FIG. 13 shows the same wood chipper 20 in a passenger or cargo van 150. As can be seen, rather than having the wood chipper module extend from the rear end of the vehicle as in the previous embodiments, in this case the wood chipper module is seen to extend from the side of the van 150 though an open side door 152. It is also clear that the user 40 can conveniently feed slash 42 into the input hopper 36 of the wood chipper module 22. The chute 44 may expel wood chips 49 into a receptacle or collection bag 154 placed on the ground beside the van 150. In addition, the power generator 24 may be placed in the rear of the van 150 and a rear door 156 opened to exhaust fumes from the power generator. Alternatively, the power generator 24 can be extended out from the rear of the van 150. The power generator 24 may be fixed within, mounted on an external cargo rack, extended from the interior to the exterior of the vehicle via a track mechanism similar to that used for the wood chipper, or any other suitable means for fixing or moving the generator.

Figure 14:
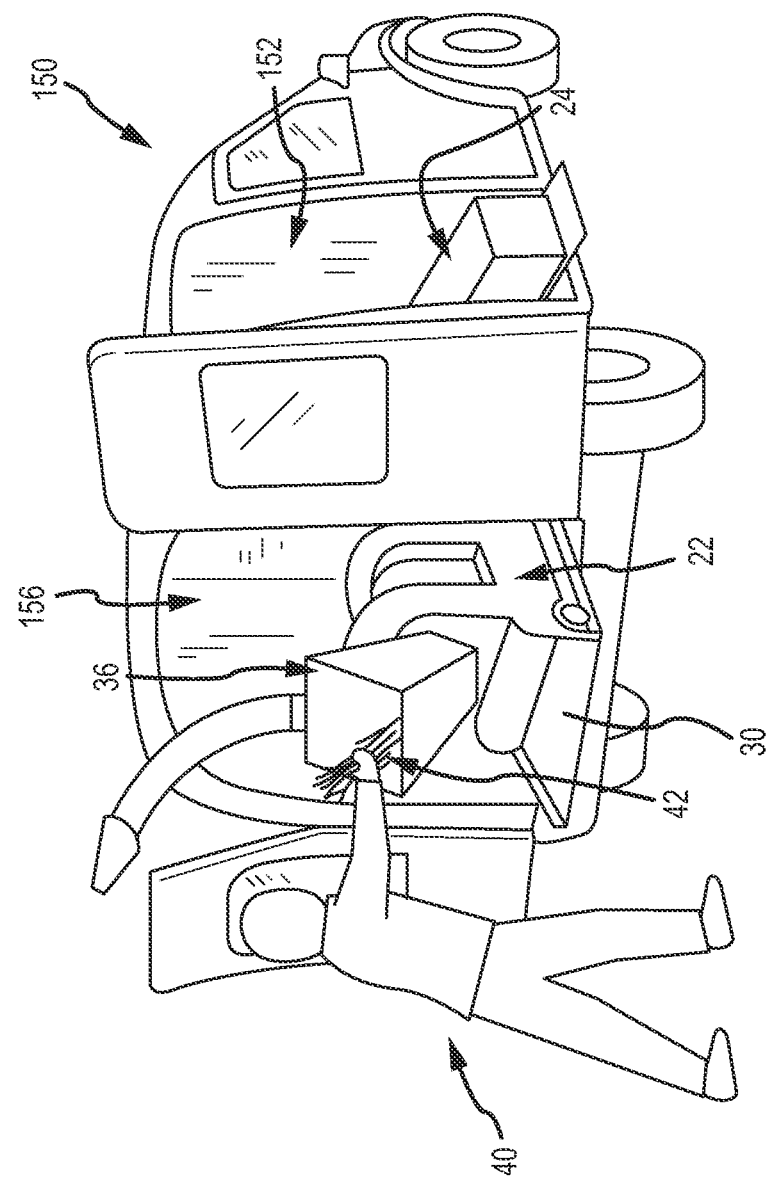
FIG. 14 is a sketch of a mobile wood chipper mounted in a van in an alternative position from that shown in FIG. 13, the wood chipper shown in an operational position with a user feeding slash into an input hopper thereof.

FIG. 14 shows an alternative arrangement where the wood chipper module 22 is located in the rear of the van 150 and can be extended rearwardly therefrom with the slidable structure 30. The power generator 24 may be located near the side door 152 for exhaust purposes (and may be extended therefrom). Again, the user 40 can conveniently feed slash 42 into the input hopper 36 of the wood chipper module 22.

Figure 12:
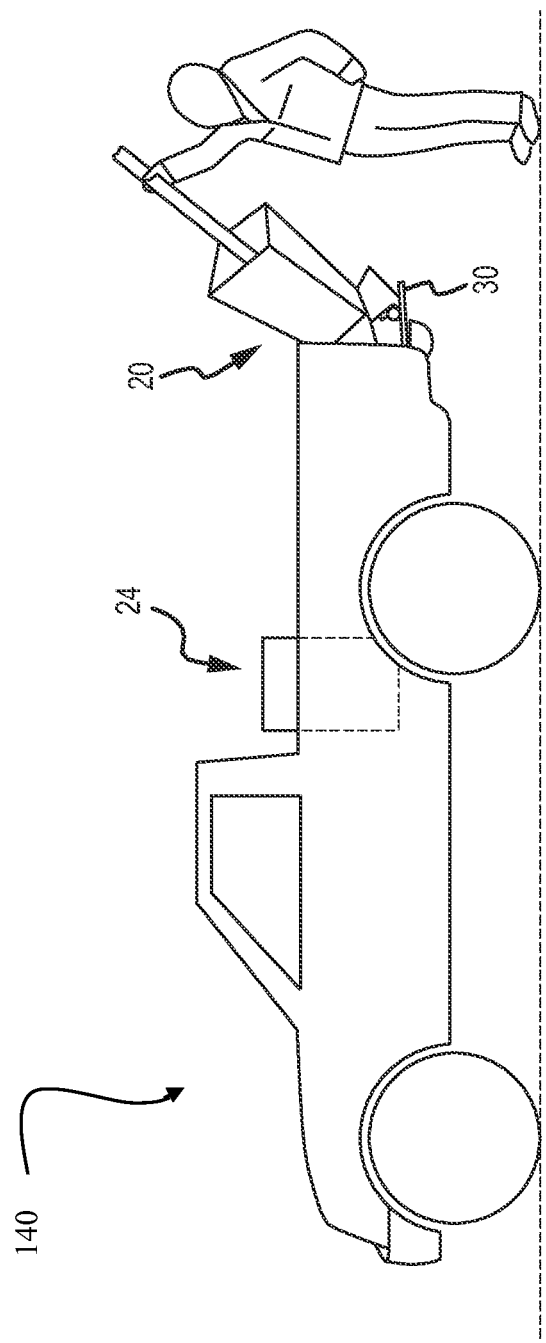
FIG. 12 is a sketch of a mobile wood chipper mounted in a pickup truck, the wood chipper shown in an operational position to where it is convenient for a user to feed slash into an input hopper thereof.

FIG. 12 shows the same wood chipper 20 in the bed of a small truck 140. As can be seen, the power generator 24 is located in the bed as is the wood chipper module 22 and the slidable structure 30. The slidable structure 30 allows the wood chipper module 22 to be moved from a stowed position to an operational position, as described above. As can be seen, the user 40 can still conveniently feed slash 42 into the input hopper 36. For some vehicles, the feed height becomes higher than is desirable. Tipping the hopper 36 such that the input port 38 is lower and adding a hydraulic feed is possible.

Figure 15:
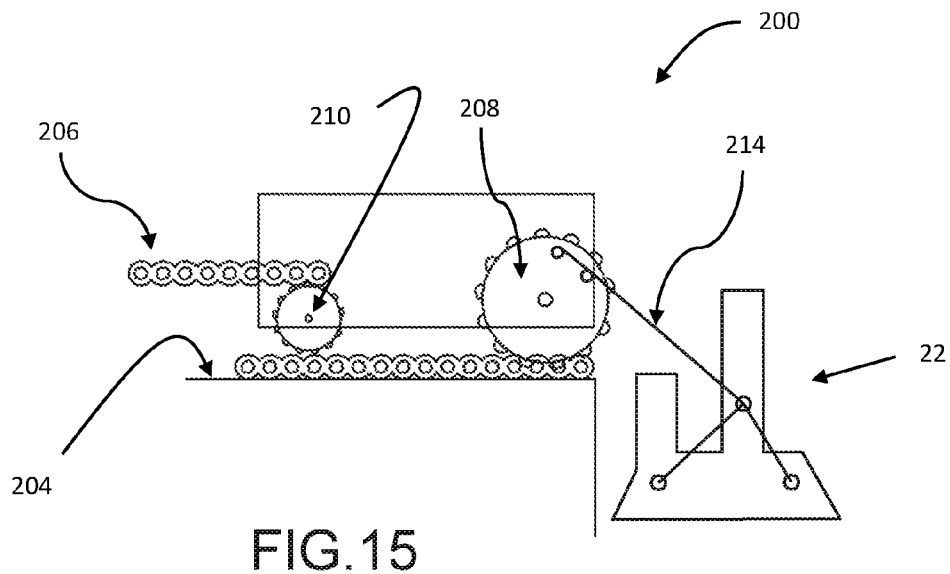
FIG. 15 is a simplified illustration for a lift mechanism for moving a wood chipper between and a transportation position and an operational position.
Figure 16:
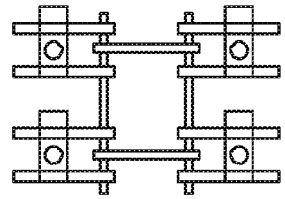
FIG. 16 shows a three track wide chain, with clips bolted through the outer tracks to constrain the chain to the desired path of the carriage.
Figure 17:
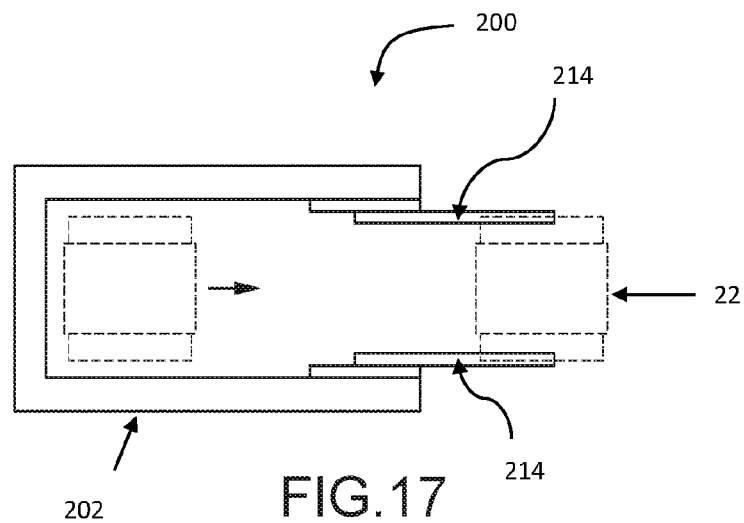
FIG. 17 is a simplified top view showing the wood chipper in the transportation and operational positions, both in phantom.
Figure 18:
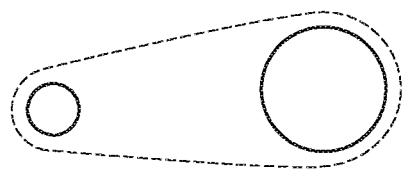
FIG. 18 shows the basic wheel elements of the carriage.
Figure 19:
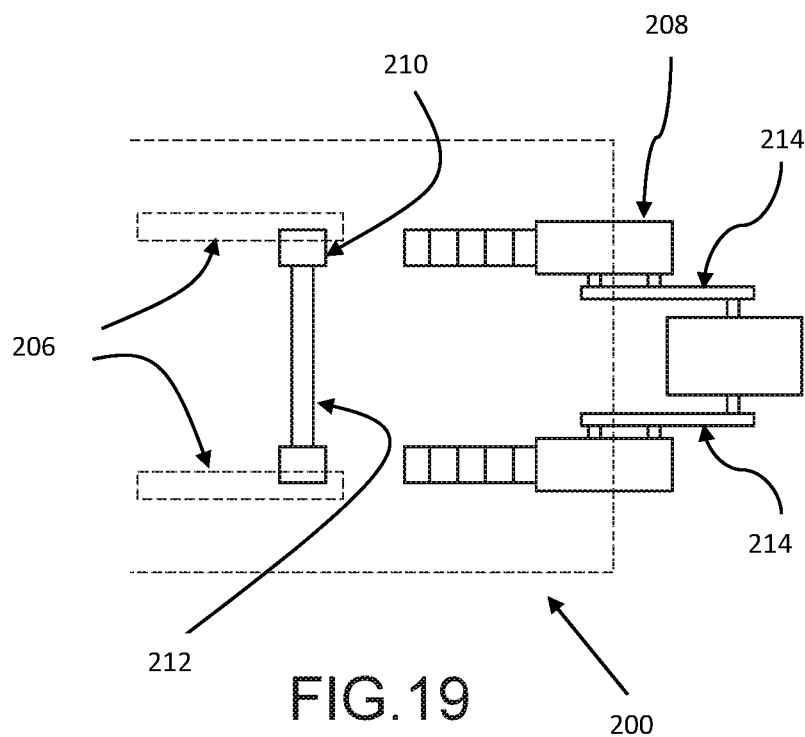
FIG. 19 shows the moving components within the bed of a vehicle such as a pickup.
Figure 20:
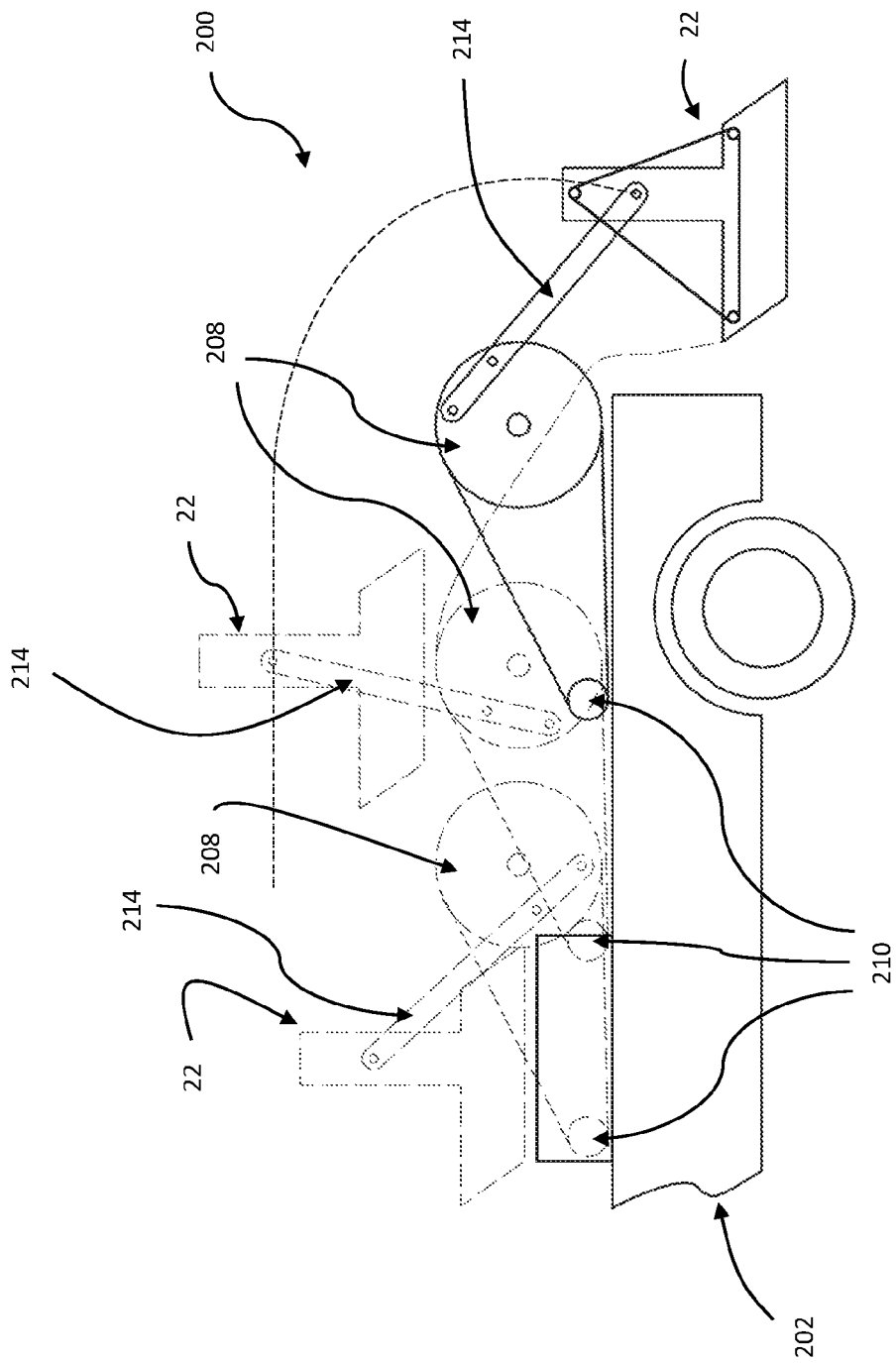
FIG. 20 shows further details of the lift mechanism of FIG. 15.

FIG. 15 shows a chain- or belt-drive system for driving a lift mechanism 200 for lowering the wood chipper 22 from a bed of a truck to a more convenient height. FIG. 16 shows a three track wide chain, with clips bolted through the outer tracks to constrain the chain to the desired path of the carriage. FIG. 17 is a simplified top view showing the wood chipper in the transportation and operational positions, both in phantom. FIG. 18 (as well as FIG. 20) shows the basic wheel elements of the carriage, wherein an 8" wheel drives (by means of a chain or track) a 24" wheel, wherein the 8" and 24" wheels are fixed in relative separation by the U-Shaped (view from above) carriage structure. FIG. 19 shows the moving components within the bed of a vehicle such as a pickup, where from right to left are the chipper assembly, the arms which support the chipper assembly from each of the 24" wheels, the path toward the stowed transport position wherein the 24" wheels are guided by a chain or track, and the 8" common axle drive wheels to the left. FIG. 20 is a side view of the rear portion of a truck bed, showing the lift mechanism for lowering and raising the wood chipper module.

The following is a description of a lift mechanism that could be added to a vehicle (e.g., a truck) having a bed higher than a station wagon, van, or small truck. A Pickup 202 might have a bed 204 that is flat 4 feet wide and 5 to 8 feet deep, and have a bed height at 33 inches (for any pickup more backroad compatible than a van). Several concepts come to mind for the lift mechanism, several for the translation mechanism. A combination lift and translate mechanism 200 may be used. In particular, this mechanism 200 must be capable of balancing the extended position cantilevered weight.

The forward side (toward the vehicle driver) of this mechanism 200 (FIG. 15) must be either weighted (more than 400 pounds two feet back, or more than 200 pounds four feet back, etc.) or a reaction rail must be utilized. The power generator itself could be used as a 300 pound counterweight at 3 or more feet back. For the concept presented herein, a reaction rail pair 206 is used to hold down the smaller wheel end of the mechanism 200. The mechanism 200 utilizes two 25" diameter wheels 208 near the chipper 22 and two 8" diameter wheels 210 further from the chipper 22 (towards the front of the vehicle bed). The top of the rear wheels 210 which are also the drive wheels (common drive mechanism/axle) react against a rail 206 above them in order to allow the load to be cantilevered. The two 25" wheels 208 never leave the rear of the bed, although they come to almost the edge.

FIG. 18 shows a large wheel which is driven by a chain or track (similar to a tank, caterpillar or track drive snowblower). In this case, as in some caterpillars, the wheels are of different sizes. The larger wheel 208 carries an offset arm which, in tandem with an opposite side wheel 208, carries (suspended from above the CG) the chipper module 22 (but not the power unit). The small wheel common axle and the independent large wheel axles are held in position by the U-shaped (as seen from above) carriage, such that the small wheel to large wheel distance remains constant. Therefore a fixed length chain or track is utilized. The bottom of the track or chain may be tied to the bed of the vehicle as shown in FIG. 16. FIG. 19 as described above shows the position of the chipper 22 large wheels 208, small wheels 208, and common drive axle 212. FIG. 20 shows in profile the extended position of the carriage for operation of the chipper 22 at a lower height than the vehicle bed, for increased operator convenience, safety, and to eliminate the need to add a hydraulic assistance feed to the hopper. In phantom, the midway and the stowed position of the carriage and chipper assembly are shown. Once in either final position, the position is maintained/locked with simple attachment of sway bars over clevis bolts as illustrated in the initial station wagon view and description.

Alternate methods envisioned include:

(1) A lift gate mechanism (Maxom, Eagle Lift, and Walt Co are vendors for delivery trucks). In such case, the 400 pound chipper 22 would have to be rollable through the lift gate to the bed.

(2) A fork lift mechanism (Maxom for instance) would have to be integrated into a translation mechanism.

(3) A 3-point hitch mechanism would have to be integrated into the translation mechanism, and overall length would be too great for the bed length in the retracted into the bed position.

The proposed solution above is a "transformer" mechanism, wherein in one position it cantilevers the load and in the other position it cradles and carries the load in the center of the vehicle bed. The mechanism lifts the load almost vertically when outside of the bed, yet translates the load horizontally within the bed, eventually setting the chipper 22 onto the lift/translate mechanism itself.

The mechanism is a U-shaped carriage with 2 outstretched arms 214 which are eccentrically mounted to the wheels 208 and hold the chipper from its sides above the vertical CG of the chipper 22. The mechanism utilizes two 25" chain (or track) driven wheels 208 which are locked in synchronous position by the U-shaped carriage and the chain drive (one on either side) and the commonly driven 8" wheels 210 at the rear of the carriage. The 8" wheels 210 are driven via a single hydraulic rotation axle drive. These rear wheels 210 as they turn bear against a top rail 206 which has a chain and thus drive the translation. As the carriage translates, a similar chain bears below the larger wheels which in turn contain the arms which carry the chipper 22. The attached drawings show the concept. Once in either position, sway bars are pinned to secure the chipper 22 in a locked position for use of transit.

In one embodiment, the power generator 24 may weigh in the range of 200-350 pounds (perhaps approximately 280 pounds) and be located between the wheels of the vehicle both front-to-back and laterally. The wood chipper module 22 may weigh in the range of 300-500 pounds (perhaps approximately 400 pounds) and be located between the wheels of the vehicle both front-to-back and laterally when in the transit position. For smaller vehicle embodiments, it is desired to have the CG of the added weight ahead of the rear axle so as to maintain normal front axle weighting for stability in transit. The combined CG of the added weight of the chipper and power unit should be forward of the rear axle in the transit configuration so as not to unload the front axle, maintaining the vehicle's native handling characteristics.

The various portions of the chipper 20 could be composed of any suitable materials and components. Merely as an example, one embodiment of the chipper includes the chipper module being a Wallenstein BX42S, the power generator being a Riemann Georger Hydra Tool Model HV16-8 (16 HorsePower, 8 gallons per minute at 2000 PSI), the carriage is a Rockler-All Terrain Mobile Base (Heavy Duty Adjustable Base with an 800 pound weight capacity and durable 5" urathane casters) available from Rockler Innovative Woodworking and Hardware of Denver, Colo.), the hydraulic motor to chipper coupling and housing is available from Hydramount Corporation of Grand Rapids, Ohio and the tachometer (diagnostic for cutter wheel speed measurement display) is available from SenDEC corporation The disclosed wood chipper embodiments provide several advantages over the prior art. First, because the wood chippers are carried within normal-sized passenger vehicles, the wood chipper can be easily driven across rugged terrain to reach locations where there may be slash to process into wood chips. Further, such normal-sized vehicles can be more efficiently operated at lower initial cost than bigger vehicles. In addition, the wood chipper is located at a height that makes it convenient for a user to feed slash thereinto, minimizing reliance on optional hydraulic feed mechanisms. Also, since slash is fed into the chipper 20 via gravity as compared to other systems where there is a hydraulic feed system, it is safer as the risk of any part of an operator being pulled into the chipper is reduced.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A system supported by and carried by a passenger vehicle, comprising:
    a slidable structure having a first portion that is slidable relative to a second portion, wherein the second portion is supported by the passenger vehicle, wherein the first portion can be slid between a first position and a second position, wherein one of the first portion and the second portion has a member that is slidably received within a member of the other portion, and the member of the first portion supports a horizontal rolling surface of the first portion;
    a wood chipper module that receives tree limbs and branches and breaks the tree limbs and branches down into wood chips, wherein the wood chipper module is movable between a first position and a second position, the wood chipper module including rollable members that are supported by and rollable on the horizontal rolling surface of the first portion of the slidable structure; and
    a power generator carried by the passenger vehicle that supplies hydraulic power to the wood chipper module, wherein the power generator does not move with the wood chipper module when the wood chipper module is moved between the first position and the second position;
    wherein when the wood chipper module is in the first position the wood chipper module is entirely contained within the passenger vehicle and when the wood chipper module is in the second position a significant portion of the wood chipper extends outside of the passenger vehicle and the wood chipper module is at least partially supported by the slidable structure and the first portion of the slidable structure is in the second position.

2. A system as defined in claim 1, further including a securing mechanism that selectively secures the wood chopper module in either the first position or the second position.

3. A system as defined in claim 2, wherein the securing mechanism includes at least one sway bar and at least one clevis bolt.

4. A system as defined in claim 1, wherein the wood chipper module includes a hopper selectively attached thereto that receives slash fed thereto by a user, wherein the hopper can be removed by the user for moving the wood chipper module into the first position and the hopper can be attached to the wood chipper module when the wood chipper module is in the second position.

5. A system as defined in claim 1, wherein the power generator is mounted to a roof of the passenger vehicle.

6. A system as defined in claim 1, the system further including a passenger vehicle, wherein the passenger vehicle is a station wagon.

7. A system, comprising:
    a passenger vehicle;
    a slidable structure having a first portion that is slidable relative to a second portion, wherein the second portion is supported by the passenger vehicle, wherein the first portion can be slid between a first position and a second position, wherein one of the first portion and the second portion has a member that is slidably received within a member of the other portion, and the member of the first portion supports a horizontal rolling surface of the first portion;
    a wood chipper module that receives tree limbs and branches and breaks the tree limbs and branches down into wood chips, wherein the wood chipper module can be moved between a first position and a second position, the wood chipper module including rollable members that are supported by and rollable on the horizontal rolling surface of the first portion of the slidable structure; and a power generator carried in the passenger vehicle that supplies hydraulic power to the wood chipper module, wherein the power generator does not move with the wood chipper module when the wood chipper module is moved between the first position and the second position;

wherein when the wood chipper module is in the first position the wood chipper module is entirely contained within the passenger vehicle and when the wood chipper module is in the second position a significant portion of the wood chipper extends outside of the passenger vehicle and the wood chipper module is at least partially supported by the slidable structure.

8. A system as defined in claim 7, wherein the wood chipper module includes a hopper selectively attached thereto that receives slash fed thereto by a user, wherein the hopper can be removed by the user for moving the wood chipper module into the first position and the hopper can be attached to the wood chipper module when the wood chipper module is in the second position.

9. A system as defined in claim 7, wherein the power generator is mounted to a roof of the passenger vehicle.

10. A system as defined in claim 7, wherein the passenger vehicle is a station wagon.

11. A system supported and carried by a passenger vehicle, comprising:

a movable structure having a first portion that is movable relative to a second portion, wherein the second portion is supported by the passenger vehicle, wherein the first portion can be moved between a first position and a second position;

a wood chipper module supported by the movable structure that receives tree limbs and branches and breaks the tree limbs and branches down into wood chips, wherein the wood chipper module can be moved between a first position and a second position, the wood chipper module having a hopper having an intake port with a bottom edge; and a power generator carried in the passenger vehicle that supplies power to the wood chipper module, wherein the power generator does not move with the wood chipper module when the wood chipper module is moved between the first position and the second position;

wherein when the wood chipper module is in the first position the wood chipper module is entirely contained within the vehicle and when the wood chipper module is in the second position a significant portion of the wood chipper module extends outside of the passenger vehicle and the bottom edge is four feet or less above the ground.

12. A system as defined in claim 11, wherein the wood chipper module includes a hopper selectively attached thereto that receives slash fed thereto by a user, wherein the hopper can be removed by the user for moving the wood chipper module into the first position and the hopper can be attached to the wood chipper module when the wood chipper module is in the second position.

13. A system as defined in claim 11, wherein the power generator is mounted to a roof of the passenger vehicle.

14. A system as defined in claim 11, wherein the passenger vehicle is a station wagon.

15. A system as defined in claim 11, wherein the passenger vehicle is a van.

16. A system as defined in claim 11, wherein the passenger vehicle is a truck.

17. A system as defined in claim 16, further including a lift mechanism for lowering the wood chipper module from a bed of the truck into a lower position for operation and for raising the wood chipper module back on to the bed of the truck for transport.

18. An apparatus supported by and carried by a truck having a bed, the apparatus comprising:

a wood chipper module that receives tree limbs and branches and breaks the tree limbs and branches down into wood chips;

a movable structure supporting the wood chipper module, the structure including a lift mechanism for lowering the wood chipper module from the bed of the truck into a lower position for operation and for raising the wood chipper module back on to the bed of the truck into a second position for transport, the lift mechanism including a linking member eccentrically mounted to a rotating member; and a power generator carried in the truck that supplies hydraulic power to the wood chipper module, wherein the power generator does not move with the wood chipper module when the wood chipper module is moved between the lower position and the second position;

wherein when the movable structure is in the second position the wood chipper module is entirely contained within the truck and when the movable structure is in the lower position the entirety of the wood chipper module extends outside of the truck.

19. An apparatus as defined in claim 18, wherein the wood chipper module includes a hopper selectively attached thereto that receives slash fed thereto by a user, wherein the hopper can be removed by the user for moving the movable structure and wood chipper module into the first position and the hopper can be attached to the wood chipper module when the movable structure is in the second position.

20. An apparatus as defined in claim 18, wherein the power generator is supported by the truck bed.

* * * * *